(12) United States Patent
Liberg et al.

(10) Patent No.: US 12,022,342 B2
(45) Date of Patent: Jun. 25, 2024

(54) GNSS ENHANCED CELL RANKING

(71) Applicant: Telefonaktiebolaget LM Ericsson (PUBL), Stockholm (SE)

(72) Inventors: Olof Liberg, Enskede (SE); Talha Khan, Santa Clara, CA (US); Helka-Liina Määttänen, Helsinki (FI); Xingqin Lin, Santa Clara, CA (US); Jonas Sedin, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 383 days.

(21) Appl. No.: 17/428,461

(22) PCT Filed: Jan. 30, 2020

(86) PCT No.: PCT/IB2020/050757
§ 371 (c)(1),
(2) Date: Aug. 4, 2021

(87) PCT Pub. No.: WO2020/165681
PCT Pub. Date: Aug. 20, 2020

(65) Prior Publication Data
US 2022/0110035 A1    Apr. 7, 2022

Related U.S. Application Data

(60) Provisional application No. 62/805,440, filed on Feb. 14, 2019.

(51) Int. Cl.
*H04W 36/00*        (2009.01)
*H04W 36/08*        (2009.01)

(52) U.S. Cl.
CPC .  *H04W 36/00835* (2018.08); *H04W 36/0085* (2018.08); *H04W 36/08* (2013.01)

(58) Field of Classification Search
CPC ....... H04W 36/00835; H04W 36/0085; H04W 36/08
See application file for complete search history.

(56) References Cited

U.S. PATENT DOCUMENTS

2010/0035601 A1    2/2010  Chen et al.
2010/0278144 A1*  11/2010  Olofsson ............... H04W 36/10
                                                                370/331

(Continued)

OTHER PUBLICATIONS

3GPP TS 36.133 v15.0.0; Technical Specification; 3rd Generation Partnership Project; Technical Specification Group Radio Access Network; Evolved Universal Terrestrial Radio Access (E-UTRA); Requirements for support of radio resource management (Release 15) [due to size, this reference has been split into two parts]—Sep. 2017.

(Continued)

*Primary Examiner* — Brian P Cox
(74) *Attorney, Agent, or Firm* — Sage Patent Group

(57) ABSTRACT

According to some embodiments, a method performed by a wireless device comprises: determining geographical location information of the wireless device with respect to each cell of a plurality of cells; adjusting a cell reselection ranking for the plurality of cells based on the geographical location information for the plurality of cells; selecting a cell from the plurality of cells based on the adjusted ranking; and camping on the selected cell.

18 Claims, 12 Drawing Sheets

(56) References Cited

U.S. PATENT DOCUMENTS

2011/0319081 A1* 12/2011 Deivasigamani ... H04W 36/305
455/436
2020/0383014 A1* 12/2020 Chen ................... H04W 72/046

OTHER PUBLICATIONS

3GPP TR 38.811 v15.0.0; Technical Report; 3rd Generation Partnership Project; Technical Specification Group Radio Access Network; Study on New Radio (NR) to support non terrestrial networks (Release 15)—Jun. 2018.
PCT International Search Report issued for International application No. PCT/IB2020/050757—dated May 6, 2020.
PCT Written Opinion of the International Searching Authority issued for International application No. PCT/IB2020/050757—dated May 6, 2020.

* cited by examiner

GNSS ENHANCED CELL RANKING

PRIORITY

This nonprovisional application is a U.S. National Stage Filing under 35 U.S.C. § 371 of International Patent Application Serial No. PCT/IB2020/050757 filed Jan. 30, 2020 and entitled "GNSS ENHANCED CELL RANKING" which claims priority to U.S. Provisional Patent Application No. 62/805,440 filed Feb. 14, 2019 both of which are hereby incorporated by reference in their entirety.

TECHNICAL FIELD

Particular embodiments relate to wireless communication, and more specifically to enhanced cell ranking based on a global navigation satellite system (GNSS) positioning information.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Third Generation Partnership Project (3GPP) includes specifications for the Evolved Packet System (EPS). EPS is based on the Long-Term Evolution (LTE) radio network and the Evolved Packet Core (EPC). It was originally intended to provide voice and mobile broadband (MBB) services but has continuously evolved to broaden its functionality. 3GPP LTE also includes narrowband Internet-of-things (NB-IoT) and LTE for machine type communication (LTE-M) and provides connectivity to massive machine type communications (mMTC) services.

3GPP Release 15 includes the first release of fifth generation (5G) networks. 5G is the next generation radio access technology which provides services such as enhanced mobile broadband (eMBB), ultra-reliable and low latency communication (URLLC) and mMTC. 5G can be based on the New Radio (NR) access stratum interface and the 5G Core Network (5GC). NR Release 15 supports operation in a set of new frequency bands in the range 24.25 GHz to 52.6 GHz. The NR physical and higher layers reuse parts of the LTE specification and add needed components when motivated by the new services.

3GPP Release 15 also includes preparation for NR operation in a non-terrestrial network (NTN) (3GPP TR 38.811). Release 16 includes additional NTN features. In parallel, LTE may also be adapted to operate in NTN. For example, LTE-M and NB-IoT may operate in an NTN.

A satellite radio access network usually includes a satellite (i.e., a space-borne platform), an earth-based gateway that connects the satellite to a base station or a core network, depending on the choice of architecture, a feeder link (i.e., the link between a gateway and a satellite), and a service link (i.e., the link between a satellite and a user equipment (UE)).

Two popular architectures are the bent pipe transponder and the regenerative transponder architectures. In the first case the base station is located on earth behind the gateway, and the satellite operates as a repeater forwarding the feeder link signal to the service link, and vice versa. In the second case the satellite is in the base station and the service link connects it to the earth-based core network.

Depending on the orbit altitude, a satellite may be categorized as low Earth orbit (LEO), medium Earth orbit (MEO), or geostationary (GEO) satellite. LEO typically includes heights ranging from 250-1,500 km and orbital periods ranging from 90-120 minutes. MEO typically includes heights ranging from 5,000-25,000 km and orbital periods ranging from 3-15 hours. GEO typically includes a height at about 35,786 km and an orbital period of 24 hours.

Propagation delay is one of the main physical properties in a satellite communication system that makes the design different from that of a terrestrial mobile system. For a bent pipe satellite network, the round-trip time (RTT) may, based on the orbit height, range from tens of ms in the case of LEO to several hundreds of ms for GEO. For comparison, the round-trip delays in a cellular network are limited to 1 ms.

To handle the large RTT in a NR based NTN, one technique is to equip each device with a Global Navigation Satellite System (GNSS) receiver. The GNSS receiver enables a device to estimate its position and the universal time (UTC). The UE can also be pre-loaded (and updated when necessary) with the ephemeris of the satellite constellation which can be theoretical or actual, and feeder link delay information. The GNSS equipped UE can compute the position and motion of the possible serving satellites to determine the propagation delay (and delay variation, Doppler shift and variation rate, etc.). In addition to position and time, the velocity of the device can be obtained by measuring the Doppler shift of the GPS signal, or by measuring the variation of the position over an extended period of time.

A communication satellite typically generates several beams over a given area. The footprint of a beam is usually in an elliptic shape, which traditionally is referred to as a cell. The footprint of a beam may also be referred to as a spotbeam. The footprint of a beam may move over the earth's surface with the satellite movement or may be earth fixed with some beam pointing mechanism used by the satellite to compensate for its motion. The size of a spotbeam depends on the system design, which may range from tens of kilometers to a few thousands of kilometers.

FIG. 1 is a block diagram illustrating an example architecture of a satellite network with bent pipe transponders. Base station 160 is located on earth behind satellite gateway 12. Satellite gateway 12 transmits a signal from base station 160 over the feeder link to satellite 14. Satellite 14 operates as a repeater forwarding the feeder link signal to the access link to wireless device 110. Signals are transmitted for wireless device 110 to base station 160 in the reverse directions.

The NTN beam may in comparison to the beams observed in a terrestrial network be very wide and cover an area outside of the area defined by the served cell. Beams covering adjacent cells will overlap and make idle and connected mode mobility based on received signal strength (RSRP) measurements challenging.

A GNSS receiver determines the travel time of a signal from a satellite by comparing the pseudo random code the receiver generates with an identical code in the signal from the satellite. The receiver "slides" its code later and later in time until it synchronizes with the satellite's code. The amount that the GNSS receiver must slide the code is equal to the signal's travel time. The code measurements are precise to a meter level accuracy.

The carrier phase measurement is a measure of the range between a satellite and receiver expressed in units of cycles of the carrier frequency. This measurement can be made with very high precision (of the order of millimeters), but the whole number of cycles between satellite and receiver is not measurable. Therefore, the device needs assistance information from a reference ground station with known location in the vicinity of the device. Combining information from a reference ground station and carrier phase measurements can improve the GNSS location to a centimeter accuracy.

Cell ranking R in a NR, NB-IoT or LTE network is based on RSRP measurement quantity. For example, the cell-ranking criterion $R_s$ for serving cell in NR is given by $$R_s = Q_{meas,s} + Q_{hyst} - Qoffset_{temp}$$

where $Q_{meas,s}$ is the RSRP measurement quantity for serving cell, $Q_{hyst}$ specifies the hysteresis value for ranking criteria, and $Qoffset_{temp}$ specifies the additional offset to be used for cell selection and reselection. It is temporarily used in case the RRC Connection Establishment fails on the cell.

The cell-ranking criterion $R_n$ for a neighboring cell in NR is given by $$R_n = Q_{meas,n} - Qoffset - Qoffset_{temp}$$

where $Q_{meas,n}$ is the RSRP measurement quantity for neighboring cell, and Qoffset specifies the additional offset. For intra-frequency, if $Qoffset_{s,n}$ that specifies the offset between the two cells is valid, Qoffset is equal to $Qoffset_{s,n}$; otherwise, Qoffset is equal to zero. For inter-frequency, if $Qoffset_{s,n}$ is valid, Qoffset is equal to $Qoffset_{s,n}$+ $Qoffset_{frequency}$ where $Qoffset_{frequency}$ specifies specific offset for equal priority NR frequencies; otherwise, Qoffset is equal to $Qoffset_{frequency}$. A UE uses the R values to rank all cells that fulfill the cell selection criterion and perform cell reselection to the highest ranked cell (unless the cell is found to be not-suitable).

To better support multi-beam operations in NR cells, a UE can measure RSRP quantities for all synchronization signal block (SSB) beams in an NR cell. If nrofSS-BlocksToAverage and absThreshSS-BlocksConsolidation are configured and the highest SSB beam measurement quantity value is larger than absThreshSS-Blocks Consolidation, the cell measurement quantity is the linear average of the power values of up to nrofSS-BlocksToAverage of highest beam measurement quantity values above absThreshSS-Blocks-Consolidation. Otherwise, the RSRP measurement quantity for the highest SSB beam is used as the measurement quantity of the corresponding cell.

For cell reselection, if rangeToBestCell is configured, among the cells whose R value is within rangeToBestCell of the R value of the highest ranked cell, the UE performs cell reselection to the cell that has the highest number of beams above the threshold absThreshSS-Blocks Consolidation. If multiple cells tie, the UE performs cell reselection to the highest ranked cell among the multiple cells.

It may be advantageous for devices in NTN to use location-based mobility. A device equipped with a GNSS receiver may, instead of using RSRP measurements for mobility, base its mobility on its geographical position relative to a set of well-defined geographical positions, such as corresponding to the cell centers in the NTN, or other examples as described with respect to FIG. 2.

FIG. 2 illustrates reference locations associated with a spot beam (e.g., cell centers). The horizontal axis represents longitude and the vertical axis represents latitude. UE 110 is illustrated at a geographical position with respect to cell centers P1, P2, P3, P4 and P5.

There currently exist certain challenges. For conventional cell reselection, a UE performs a ranking of neighboring cells and selects to the highest ranked cell. The ranking is often performed based on measured signal strength assisted by a prioritization among the neighboring cells. Thus, 3GPP systems base the cell reselection ranking metric on signal strength measurements and do not consider NTN specific aspects. One aspect is that RSRP measurements across a set of multiple cells in an NTN network may display limited signal level variations because of the geometry in satellite networks as well as the slow signal drop-off in spotbeam antenna patterns. This makes it difficult to base a reliable cell reselection ranking entirely on RSRP.

SUMMARY

As described above, certain challenges currently exist with cell reselection in a non-terrestrial network (NTN). Certain aspects of the present disclosure and their embodiments may provide solutions to these or other challenges.

For example, particular embodiments base the cell ranking on optional global navigation satellite system (GNSS) measurements, that improve the radio resource control (RRC) idle mode mobility in a NTN. Particular embodiments improve RRC idle and connected mode cell ranking based on GNSS based geographical measurements.

According to some embodiments, a method performed by a wireless device comprises: determining geographical location information of the wireless device with respect to each cell of a plurality of cells; adjusting a cell reselection ranking for the plurality of cells based on the geographical location information for the plurality of cells; selecting a cell from the plurality of cells based on the adjusted ranking; and camping on the selected cell.

In particular embodiments, the method further comprises ranking the plurality of cells based on a reference signal received power (RSRP) measurement of each cell of the plurality of cells.

In particular embodiments, the geographical location information comprises a distance between the wireless device and a reference point associated with a cell of the plurality of cells. The reference point may comprise a center of the cell. The geographical location information may comprise any one or more of the following: a distance between the wireless device and a reference point associated with a synchronization signal beam (SSB) of a cell of the plurality of cells; a distance between the wireless device and a satellite serving a cell of the plurality of cells; a round trip time (RTT) associated with a satellite serving a cell of the plurality of cells; and an angle of elevation between the wireless device and a satellite serving a cell of the plurality of cells.

In particular embodiments, adjusting the ranking for the plurality of cells based on the geographical location information comprises adjusting a RSRP measurement for each cell as a function of the geographical location information of the wireless device with respect to each cell and reranking the plurality of cells using the adjusted RSRP measurement for each cell.

In particular embodiments, the method further comprises receiving the function to use for adjusting the RSRP measurement for each cell from a network node.

In particular embodiments, adjusting the RSRP measurement for each cell comprises adjusting the RSRP measurement based on an RSRP measurement inaccuracy of the wireless device.

In particular embodiments, the method further comprises receiving an indication from a network node that the wireless device may determine a ranking for the plurality of cells by using geographical location information.

According to some embodiments, a wireless device comprises processing circuitry operable to perform any of the wireless device methods described above.

According to some embodiments, a method performed by a network node comprises transmitting an indication to a wireless device that the wireless device may determine a cell reselection ranking for a plurality of cells by adjusting a ranking based on geographical location information of the wireless device with respect to each cell of the plurality of cells.

In particular embodiments, the method further comprises transmitting to the wireless device an indication of a function that the wireless device may use to determine a ranking for a plurality of cells by adjusting a RSRP ranking based on geographical location information of the wireless device with respect to each cell of the plurality of cells.

In particular embodiments, the method further comprises transmitting to the wireless device an indication of a type of geographical location information that the wireless device may use to determine a cell reselection ranking for a plurality of cells. The geographic location information comprises any one or more of the following: a distance between the wireless device and a reference point associated with a cell of the plurality of neighbor cells; a distance between the wireless device and a reference point associated with a SSB of a cell of the plurality of cells; a distance between the wireless device and a satellite serving a cell of the plurality of cells; a RTT associated with a satellite serving a cell of the plurality of cells; and an angle of elevation between the wireless device and a satellite serving a cell of the plurality of cells.

According to some embodiments, a network node comprises processing circuitry operable to perform any of the network node methods described above.

Also disclosed is a computer program product comprising a non-transitory computer readable medium storing computer readable program code, the computer readable program code operable, when executed by processing circuitry to perform any of the methods performed by the wireless device described above.

Another computer program product comprises a non-transitory computer readable medium storing computer readable program code, the computer readable program code operable, when executed by processing circuitry to perform any of the methods performed by the network node described above.

Certain embodiments may provide one or more of the following technical advantages. For example, particular embodiments improve NTN cell ranking based mobility procedures when GNSS based measurements are available. Particular embodiments may also be applicable to GNSS-assisted cell ranking in terrestrial networks.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

As described above, certain challenges currently exist with cell reselection in a non-terrestrial network (NTN). Certain aspects of the present disclosure and their embodiments may provide solutions to these or other challenges.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In a cellular network, the radio resource control (RRC) Idle/Inactive mode mobility cell reselection procedure is based on reference signal received power (RSRP) measurements. In some embodiments, RSRP is complemented by one or more of the following quantities: (a) the distance between the device and a reference point associated with a cell; (b) the distance between the device and a reference point associated with an synchronization signal block (SSB) beam of a new radio (NR) cell; (c) the distance between the device and the satellite(s) serving each cell; (d) the round-trip time (RTT) offered by the satellite(s) serving each cell; and (d) the angle of elevation between the device and the satellite(s) serving each cell.

These quantities may be used to rank the cells for cell reselection. In one example, a device may only include cells in its ranking that supports an RTT below a configured threshold. As another example, a device may only include cells in its ranking that has an elevation angle above a configured threshold.

Particular embodiments include location-based cell ranking for single beam operation. In some embodiments, a device in RRC Idle/Inactive measures the RSRP from N surrounding cells to generate a ranking $R_{RSRP} \in \{1, \ldots, N\}$ of the cells. The cell with highest RSRP is associated with a rank $R_{RSRP}=1$, while the cell with weakest RSRP is associated with rank $R_{RSRP}=N$.

Figure 1:
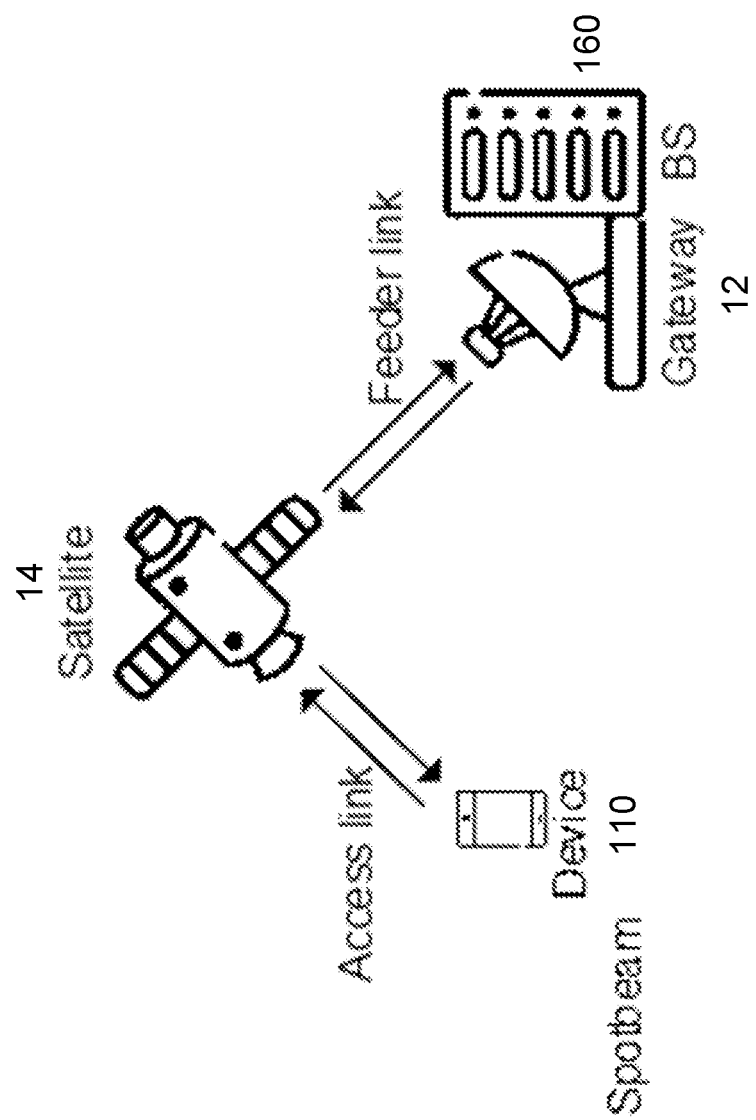
FIG. 1 is a block diagram illustrating an example architecture of a satellite network with bent pipe transponders.
Figure 2:
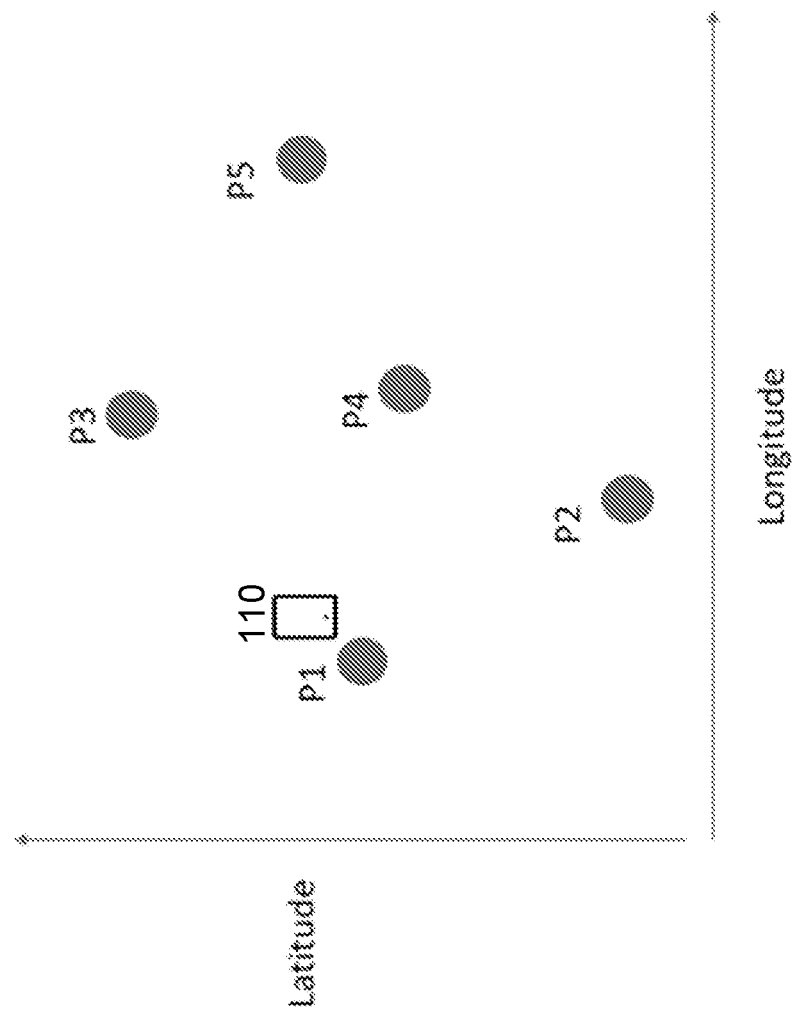
FIG. 2 illustrates reference locations associated with a spot beam (e.g., cell centers)

The device may optionally also determine the distance D between its own position and a set of reference points, each corresponding to the center of a surrounding cell (see FIG. 2). A second ranking $R_{GNSS} \in \{1, \ldots, N\}$ based on distance is generated with a rank $R_{GNSS}=1$ associated to the geographically closest cell, and a rank $R_{GNSS}=N$ associated with the cell furthest away in distance.

In some embodiments, the UE adjusts the $RSRP_C$ of each cell C based on the distance-based ranking $R_{GNSS,C}$, if available:

$$RSRP'_C = F(RSRP_C, R_{GNSS,C}) \quad \text{(Eq. 1)}$$

As one example, the function F is implemented as follows:

$$RSRP'_C = F(RSRP_C, R_{GNSS,C}) = RSRP_C - \Delta RSRP \cdot (R_{GNSS,C} - 1) \quad \text{(Eq. 2)}$$

with ΔRSRP being an adjustment in RSRP. ΔRSRP may in turn be dependent on the RSRP measurement inaccuracy of the device. This measurement inaccuracy is typically dependent on the signal to noise and interference ratio (SINR) experienced by the device in each evaluated cell C (3GPP TS 36.133 v15.0.0). Such an approach makes ΔRSRP cell specific:

$$\Delta RSRP_C = G(SINR_C) \quad \text{(Eq. 3)}$$

The device then re-ranks the surrounding cells based on $RSRP_C'$ and uses this to perform its idle/inactive mode mobility including cell and tracking area selection. If the distance-based ranking $R_{GNSS,C}$, is not available, the device performs its mobility based on the RSRP cell ranking $R_{RSRP}$.

Particular embodiments include signaling to support location-based cell ranking. The function G may be implemented in a tabulated form where a certain cell specific downlink $SINR_C$ is mapped to a ΔRSRP value. The table may either be fixed in the 3GPP specifications or signaled by the network to the device.

The value ΔRSRP in function F may also be replaced by network signaling where the value $\Delta RSRP_C$ for each surrounding cell C, including the camped-on cell, is signaled to each device camping on the cell. Such specific signaling may be used, for example, to override Eq. 3 with a cell specific $\Delta RSRP_C$ value independent of the experienced SINR.

The network may also broadcast a 1-bit information in its System Information to activate GNSS-assisted cell ranking for all UEs camped on that cell. When it is activated, the UEs camped on the cell can use GNSS-assisted cell ranking. When it is deactivated, the UEs camped on that cell are not allowed to use GNSS-assisted cell ranking.

In some embodiments, a device may consider together with the above-mentioned location information or independently the tracking area code (TAC) of a cell such that the device does not reselect a cell that is broadcasting a TAC demanding UE to make tracking area update unless a stricter RSRP threshold, or location threshold, or a combination thereof is fulfilled. The additional offset may be broadcasted in system information as a parameter Offset_tau.

Some embodiments include location-based cell ranking for multi-beam operation. A UE measures RSRP quantities for all SSB beams in an NR cell. The device may optionally also determine the distance between its own position and one or more reference points in the cell. Based on the measured distance a revised measurement quantity $Q_{meas}'[i]$ is given by $$Q'_{meas,c}[i] = f(Q_{meas,c}[i], D_{meas,c}[i])$$

where $Q_{meas,c}[i]$ is the RSRP measurement quantity for SSB beam i in the cell c, and $D_{meas,c}[i]$ is the distance measurement quantity for SSB beam i in the cell c.

In one example, $D_{meas,c}[i]$ is the same for all SSB beams and is the distance between the device position and a reference point in the cell c (e.g., the center of cell c). In another example, $D_{meas,c}[i]$ is different for different SSB beams and is the distance between the device position and a reference point associated with the SSB beam i in the cell c, (e.g., the center of the SSB beam i in cell c).

Similar to the single-beam embodiments described above, in one example the function $f(\bullet)$ is implemented as follows. Rank all the distance measurement quantities. Denote by $\text{rank}(D_{meas,c}[i])$ the rank of the SSB beam i in the cell c, and $\text{rank}(D_{meas,c}[i])$ takes a value in the range of $[1, 2, \ldots, M]$, where M is the total number of the SSB beams measured. A rank 1 is associated with the SSB beam that has the smallest distance measurement quantity. A rank M is associated with the SSB beam that has the largest distance measurement quantity.

The revised measurement quantity is then given by $$Q'_{meas,c}[i] = Q_{meas,c}[i] - \Delta_c[i] * (\text{rank}(D_{meas,c}[i]) - 1)$$

where $\Delta_c[i]$ is a biasing factor associated with SSB beam i in the cell c. In one embodiment, $\Delta_c[i]$ may be configured by the network. For example, a single biasing value can be configured for cell c and used for all the SSB beams associated with the cell c. In another embodiment, $\Delta_c[i]$ may be derived from the downlink SINR of the SSB i associated with the cell c, similar to the single-beam embodiments described above.

For the revised measurement quantity $$R'_s[i] = Q'_{meas,s}[i] + Q_{hyst} - Qoffset_{temp}$$

$$R'_n[i] = Q'_{meas,n}[i] - Qoffset - Qoffset_{temp}$$

where $R_s'[i]$ is the R' value for SSB beam i in the serving cell and $R_n'[i]$ is the R' value for SSB beam i in the neighbor cell. In one example, a threshold $R_{th}'$ is configured. The UE performs cell reselection to the cell that has the highest number of beams with R' value above the threshold $R_{th}'$.

In particular embodiments, the R' values for cell ranking are given by $$R'_s = g(Q'_{meas,s}[0], \ldots, Q'_{meas,s}[M_s - 1]) + Q_{hyst} - Qoffset_{temp}$$

$$R'_n = g(Q'_{meas,s}[0], \ldots, Q'_{meas,s}[M_n - 1]) - Qoffset - Qoffset_{temp}$$

where $R_s'$ is the R' value in the serving cell, $R_n'$ is the R' value in the neighbor cell, $M_s$ is the number of SSB beams in the serving cell, and $M_n$ is the number of SSB beams in the neighbor cell.

In one example, the function $g(\bullet)$ is a max function given by $$g(Q'_{meas,c}[0], \ldots, Q'_{meas,c}[M_c - 1]) = \max_i Q'_{meas,c}[i]$$

In another example, the function g ($Q_{meas,c}'[0], \ldots, Q_{meas,c}'[M_c-1]$) is equal to the linear average of the power values of up to a configured number of highest beam measurement quantity values of cell c above threshold $R_{th}'$.

Some embodiments include RSRP measurements triggered by a change in location-based ranking. For example, a device may compare the signal strength cell ranking $R_{RSRP}$ with the distance-based cell ranking $R_{GNSS}$. In case the K highest ranked cells differ, the device triggers a new RSRP measurement of each surrounding cell, or beam, and recalculates the ranking. K is an integer that may be configured between 1 and N.

If the device performs a filtering across stored RSRP measurement samples to derive its RSRP metric used for ranking, then the UE may first flush its measurement buffers of earlier performed RSRP measurements. This enables the device to obtain a new set of RSRP values that are independent of earlier performed measurements.

In particular embodiments, a device may make periodic GNSS measurements to compute a GNSS based cell ranking. Upon detecting a change in the GNSS based cell ranking the device may trigger a new RSRP measurement for the purpose of performing a RSRP based cell ranking to enhance the cell reselection efficiency. If the GNSS based ranking remains unmodified, the device may refrain from performing RSRP measurements for the purpose of cell ranking.

Some embodiments include RSRP triggered location measurements. In some embodiments, a device may make periodic RSRP measurements to compute a RSRP-based cell ranking. Upon detecting a change in the RSRP-based cell ranking, the device may perform new GNSS measurement for the purpose of performing a GNSS based cell ranking to enhance the cell reselection efficiency. If the RSRP based ranking remains unmodified, the device may refrain from performing GNSS measurements for cell ranking.

Figure 3:
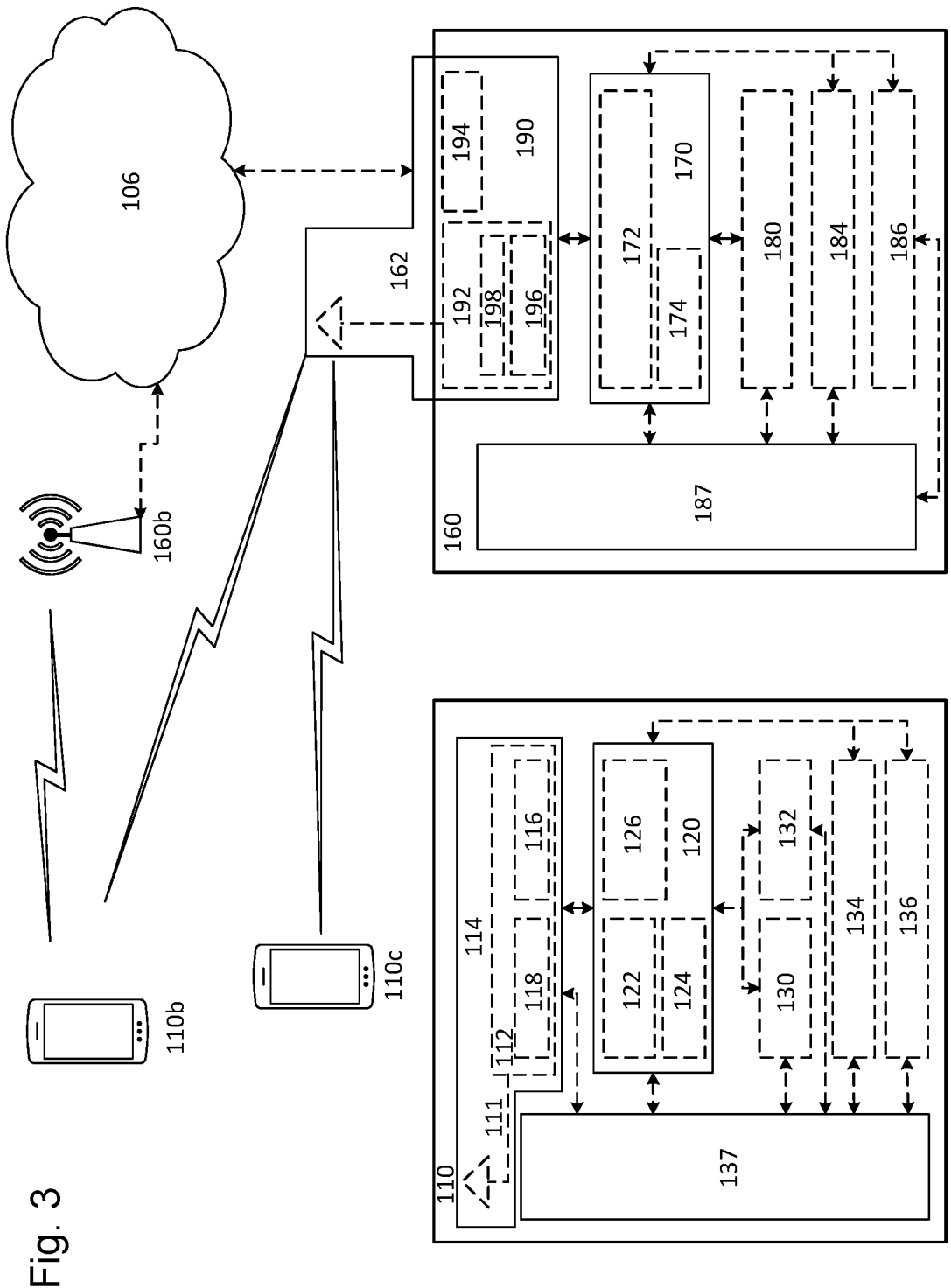
FIG. 3 is a block diagram illustrating an example wireless network.

FIG. 3 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), New Radio (NR), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 3, network node 160 includes processing circuitry 170, device readable medium 180, interface 190, auxiliary equipment 184, power source 186, power circuitry 187, and antenna 162. Although network node 160 illustrated in the example wireless network of FIG. 3 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB, gNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 3 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner.

In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 3. For simplicity, the wireless network of FIG. 3 only depicts network 106, network nodes 160 and 160b, and WDs 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 4:
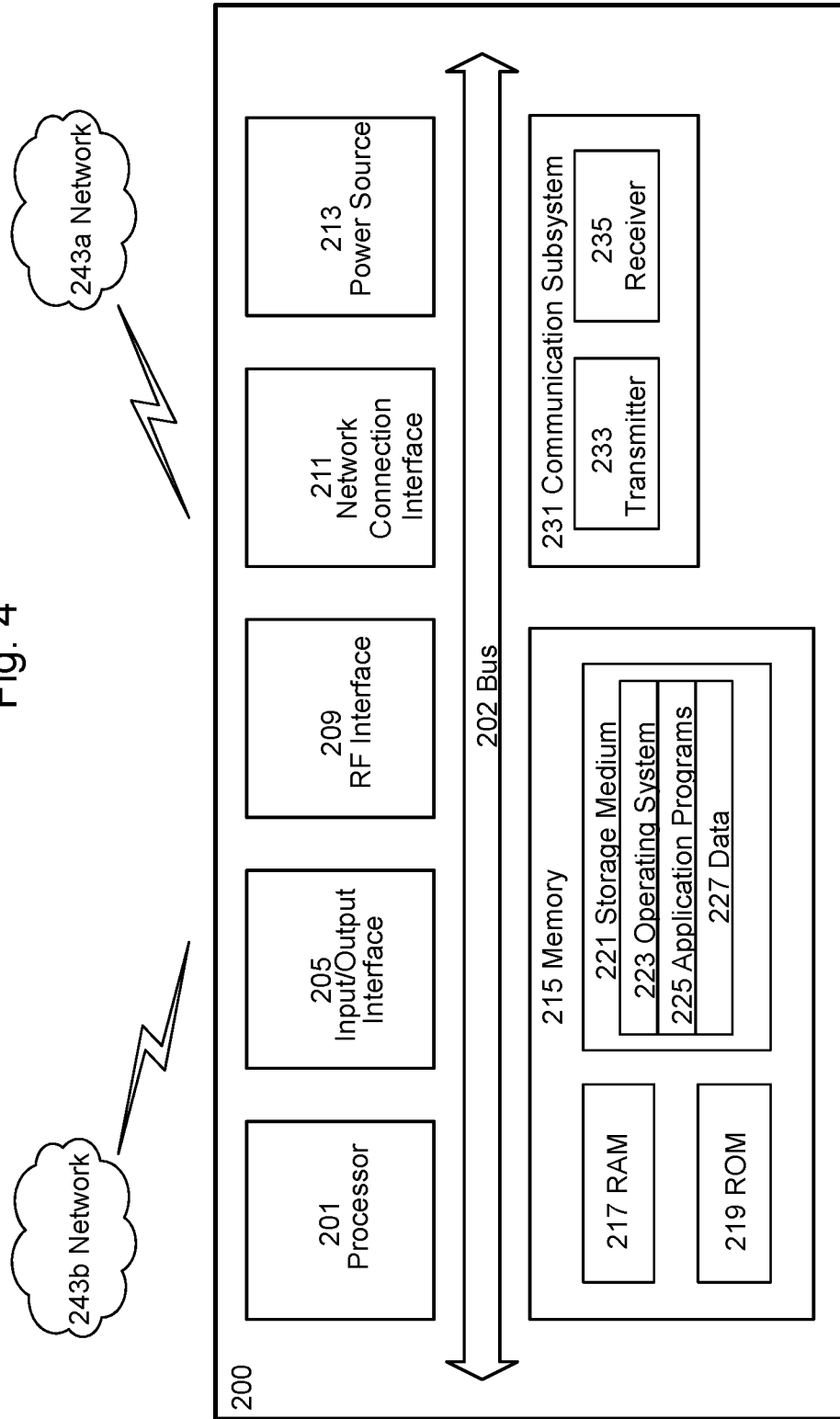
FIG. 4 illustrates an example user equipment, according to certain embodiments.

FIG. 4 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 4, is one example of a WD configured for communication in accordance with one or more communication standards promulgated by the $3^{rd}$ Generation Partnership Project (3GPP), such as 3GPP's GSM, UMTS, LTE, and/or NR standards. As mentioned previously, the term WD and UE may be used interchangeable. Accordingly, although FIG. 4 is a UE, the components discussed herein are equally applicable to a WD, and vice-versa.

In FIG. 4, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may use all the components shown in FIG. 4, or only a subset of the components. The level of integration between the components may vary from one UE to another UE. Further, certain UEs may contain multiple instances of a component, such as multiple processors, memories, transceivers, transmitters, receivers, etc.

In FIG. 4, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 4, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 4, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 5:
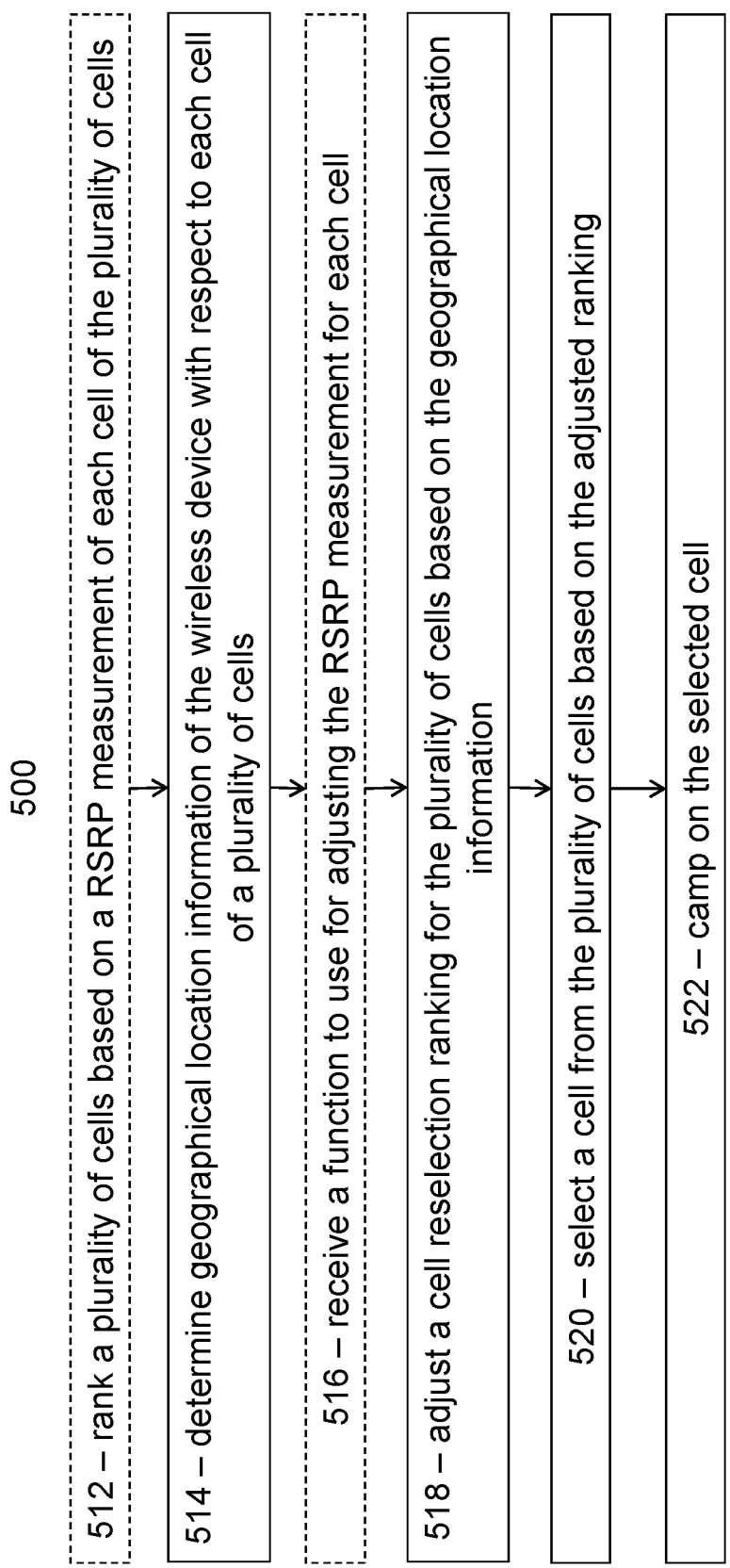
FIG. 5 is flowchart illustrating an example method in a wireless device, according to certain embodiments.

FIG. 5 is a flowchart illustrating an example method in a wireless device, according to certain embodiments. In particular embodiments, one or more steps of FIG. 5 may be performed by wireless device 110 described with respect to FIG. 3.

The method may begin at step 512, where the wireless device (e.g., wireless device 110) ranks a plurality of cells based on a RSRP measurement of each cell of the plurality of cells. For example, the plurality of cells may comprise a plurality of neighbor cells and the wireless device may rank each cell based on signal quality in anticipation of a handover.

At step 514, the wireless device determines geographical location information of the wireless device with respect to each cell of a plurality of cells. In particular embodiments, the geographical location information comprises a distance between the wireless device and a reference point associated with a cell of the plurality of cells. The reference point may comprise a center of the cell. For example, wireless device 110 may determine its distance from each of cells P1-P5 illustrated in FIG. 2.

In some embodiments, the geographical location information may comprises any one or more of the following: a distance between the wireless device and a reference point associated with a SSB of a cell of the plurality of cells; a distance between the wireless device and a satellite serving a cell of the plurality of cells; a RTT associated with a satellite serving a cell of the plurality of cells; and an angle of elevation between the wireless device and a satellite serving a cell of the plurality of cells.

At step 516, the wireless device may receive a function to use for adjusting the RSRP measurement for each cell from a network node. For example, wireless device 110 may receive a function from network node 160. Wireless device may use the function in the next step.

At step 518, the wireless device adjusts a cell reselection ranking for the plurality of cells based on the geographical location information for the plurality of cells. For example, cell P5 may be ranked higher than cell P3 because cell P5 has a slightly better RSRP measurement value than cell P3. However, cell P5 may be significantly farther away from wireless device 110 than cell P3. Adjusting the ranking based on the geographical location information may result in cell P5 being ranked higher than cell P3.

In particular embodiments, adjusting the ranking for the plurality of cells based on the geographical location information comprises adjusting a RSRP measurement for each cell as a function of the geographical location information of the wireless device with respect to each cell and reranking the plurality of cells using the adjusted RSRP measurement for each cell.

In particular embodiments, adjusting the RSRP measurement for each cell comprises adjusting the RSRP measurement based on an RSRP measurement inaccuracy of the wireless device.

At step 520, the wireless device selects a cell from the plurality of cells based on the adjusted ranking. At step 522, the wireless device camps on the selected cell.

Modifications, additions, or omissions may be made to method 500 of FIG. 5. Additionally, one or more steps in the method of FIG. 5 may be performed in parallel or in any suitable order. For example, step 516 may be performed at any time in the sequence. In some embodiments, step 516 may be performed once in advance and in some embodiments step 516 may be performed for each cell reselection.

Figure 6:
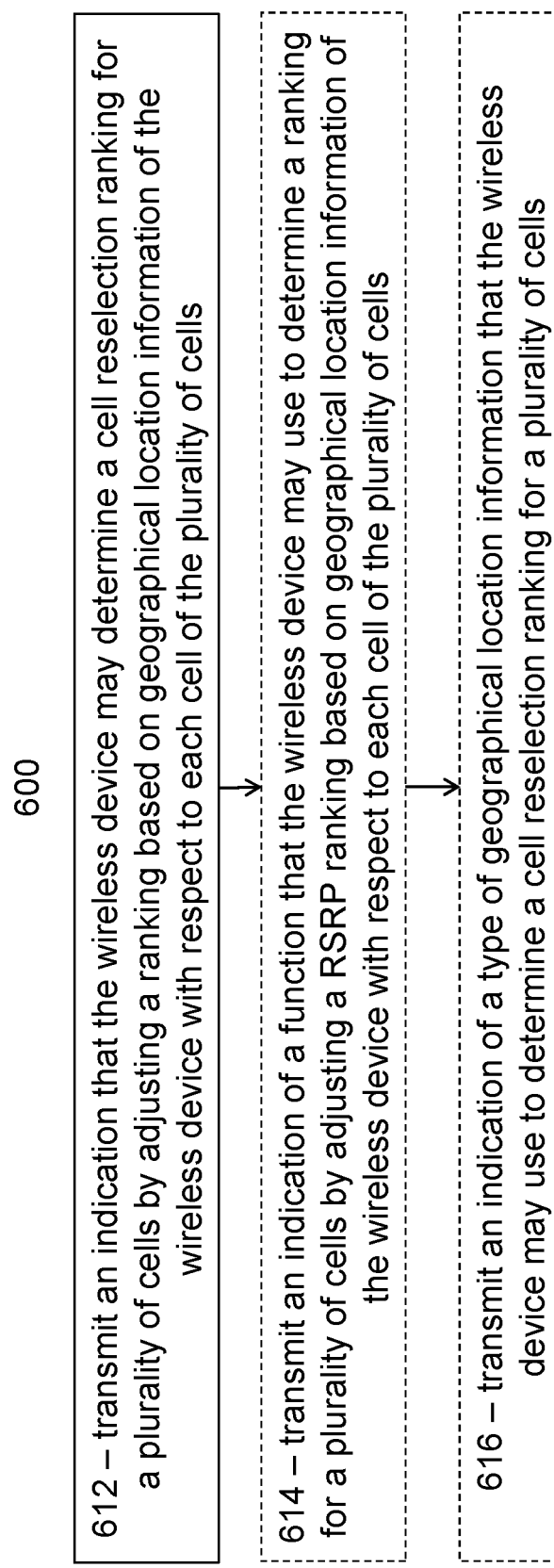
FIG. 6 is a flowchart illustrating an example method in a network node, according to certain embodiments.

FIG. 6 is a flowchart illustrating an example method in a network node, according to certain embodiments. In particular embodiments, one or more steps of FIG. 6 may be performed by network node 160 described with respect to FIG. 3.

The method begins at step 612, where the network node (e.g., network node 160) transmits an indication to a wireless device (e.g., wireless device 110) that the wireless device may determine a cell reselection ranking for a plurality of cells by adjusting a ranking based on geographical location information of the wireless device with respect to each cell of the plurality of cells.

At step 614, the network node transmits to the wireless device an indication of a function that the wireless device may use to determine a ranking for a plurality of cells by adjusting a RSRP ranking based on geographical location information of the wireless device with respect to each cell of the plurality of cells.

At step 616, the network node transmits to the wireless device an indication of a type of geographical location information that the wireless device may use to determine a cell reselection ranking for a plurality of cells. The geographic location information comprises any one or more of the following: a distance between the wireless device and a reference point associated with a cell of the plurality of neighbor cells; a distance between the wireless device and a reference point associated with a SSB of a cell of the plurality of cells; a distance between the wireless device and a satellite serving a cell of the plurality of cells; a RTT associated with a satellite serving a cell of the plurality of cells; and an angle of elevation between the wireless device and a satellite serving a cell of the plurality of cells.

Modifications, additions, or omissions may be made to method 600 of FIG. 6. Additionally, one or more steps in the method of FIG. 6 may be performed in parallel or in any suitable order.

Figure 7:
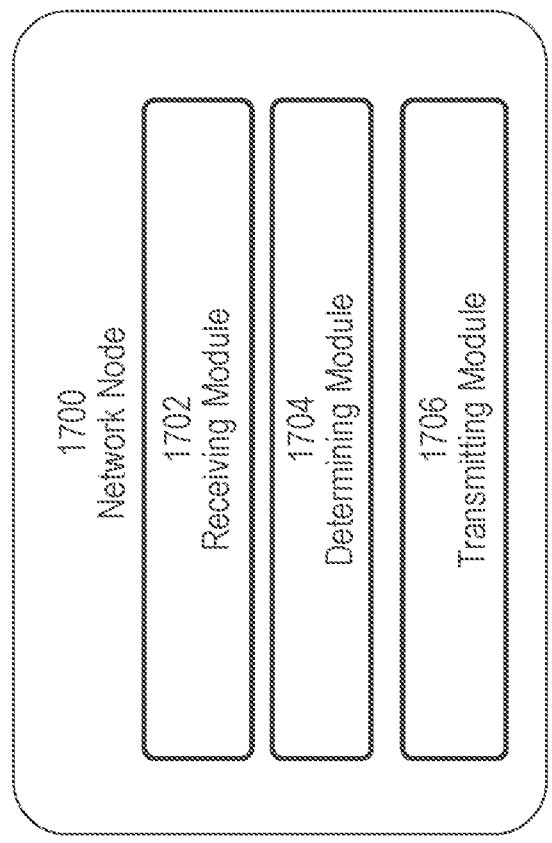
FIG. 7 illustrates a schematic block diagram of a wireless device and network node in a wireless network, according to certain embodiments.
Figure 7:
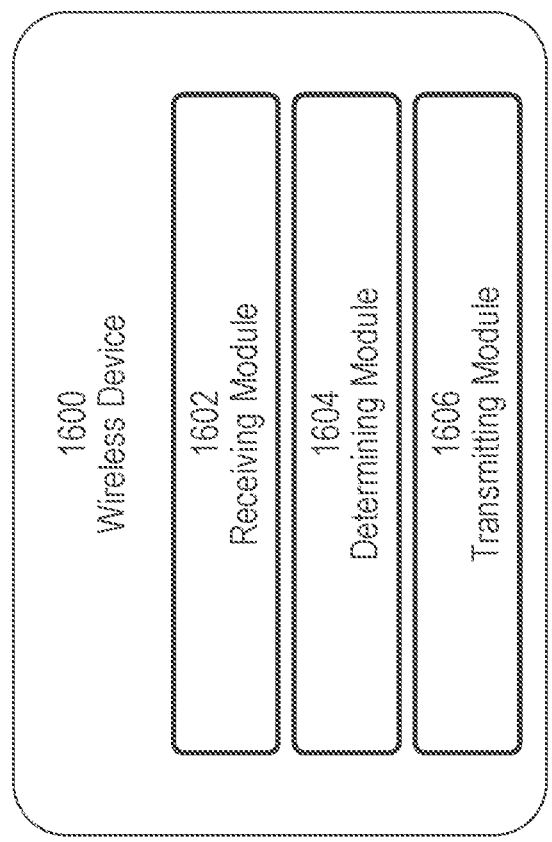

FIG. 7 illustrates a schematic block diagram of two apparatuses in a wireless network (for example, the wireless network illustrated in FIG. 3). The apparatuses include a wireless device and a network node (e.g., wireless device 110 and network node 160 illustrated in FIG. 3). Apparatuses 1600 and 1700 are operable to carry out the example methods described with reference to FIGS. 5 and 6, respectively, and possibly any other processes or methods disclosed herein. It is also to be understood that the methods of FIGS. 5 and 6 are not necessarily carried out solely by apparatus 1600 and/or apparatus 1700. At least some operations of the method can be performed by one or more other entities.

Virtual apparatuses 1600 and 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause receiving module 1602, determining module 1604, transmitting module 1606, and any other suitable units of apparatus 1600 to perform corresponding functions according one or more embodiments of the present disclosure. Similarly, the processing circuitry described above may be used to cause receiving module 1702, determining module 1704, transmitting module 1706, and any other suitable units of apparatus 1700 to perform corresponding functions according one or more embodiments of the present disclosure.

As illustrated in FIG. 7, apparatus 1600 includes receiving module 1602 configured to receive cell reselection configuration information (e.g., enable/disable use of geographic information for cell ranking, function for adjusting a cell ranking, etc.), according to any of the embodiments and examples described herein. Apparatus 1600 also includes determining module 1604 configured to determine cell rankings, adjust cell rankings, and select cells, according to any of the embodiments and examples described herein.

As illustrated in FIG. 7, apparatus 1700 includes determining module 1704 configured to determine how to configure a device for performing cell reselection, according to any of the embodiments and examples described herein. Transmitting module 1706 is configured to transmit cell reselection configuration information (e.g., enable/disable use of geographic information for cell ranking, function for adjusting a cell ranking, etc.) to a wireless device, according to any of the embodiments and examples described herein.

Figure 8:
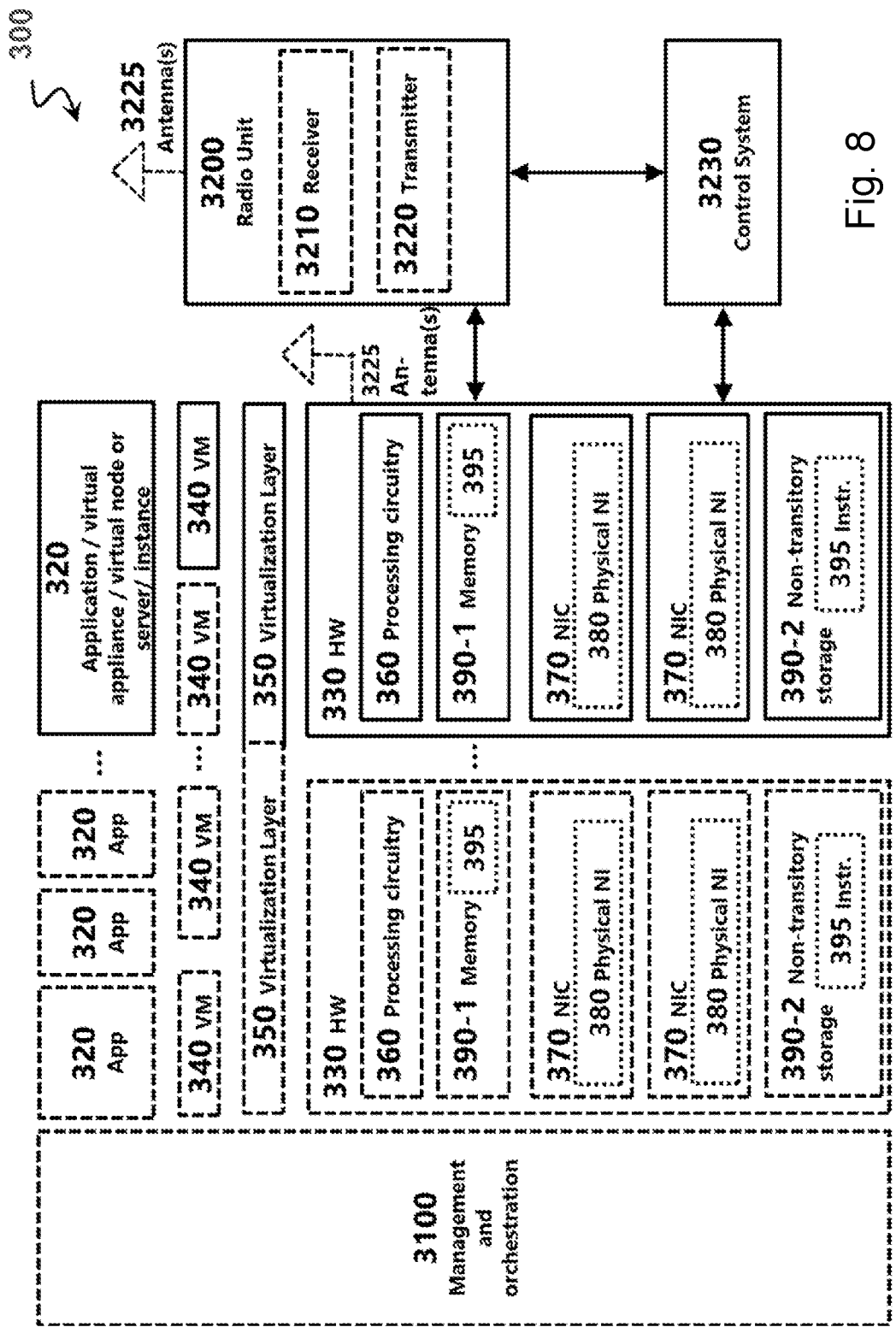
FIG. 8 illustrates an example virtualization environment, according to certain embodiments.

FIG. 8 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 8, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Figure 9:
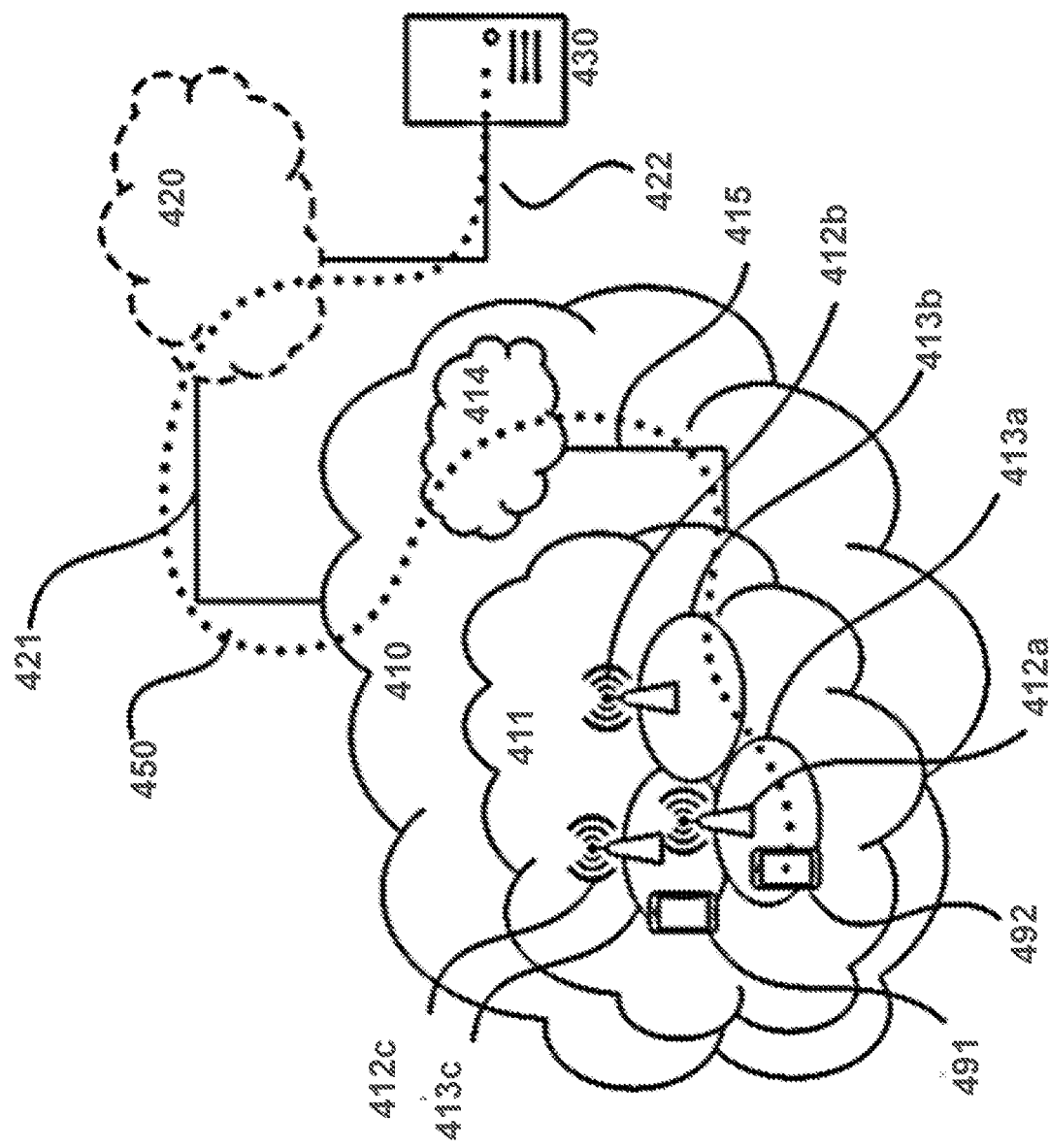
FIG. 9 illustrates an example telecommunication network connected via an intermediate network to a host computer, according to certain embodiments.

Still in the context of NFV, Virtual Network Function (VNF) is responsible for handling specific network functions that run in one or more virtual machines 340 on top of hardware networking infrastructure 330 and corresponds to application 320 in FIG. 9.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

With reference to FIG. 9, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more subnetworks (not shown).

The communication system of FIG. 9 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 10:
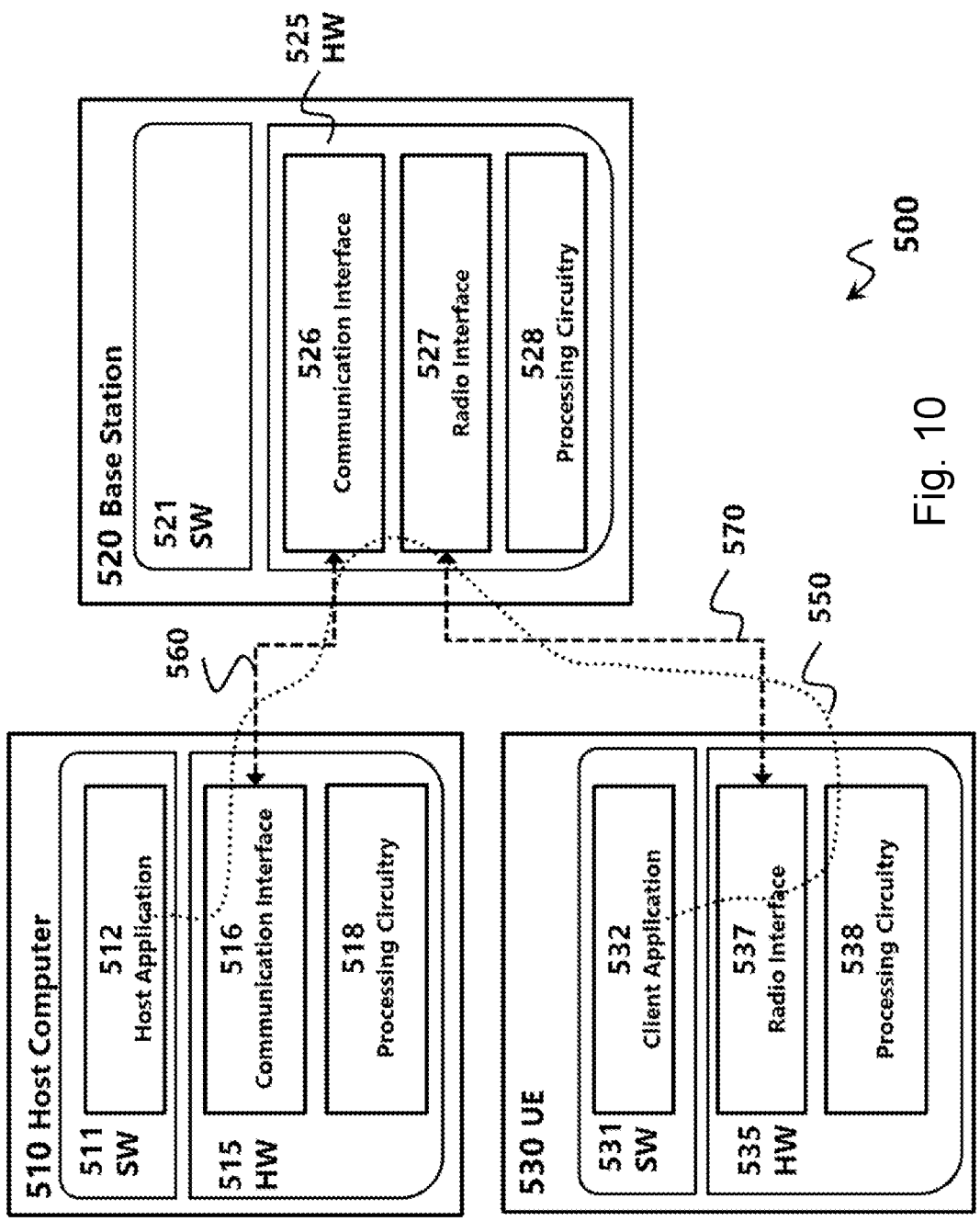
FIG. 10 illustrates an example host computer communicating via a base station with a user equipment over a partially wireless connection, according to certain embodiments.

FIG. 10 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 10. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 10) served by base station 520. Communication interface 526 may be configured to facilitate connection 560 to host computer 510. Connection 560 may be direct, or it may pass through a core network (not shown in FIG. 10) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 10 may be similar or identical to host computer 430, one of base stations 412*a*, 412*b*, 412*c* and one of UEs 491, 492 of FIG. 9, respectively. This is to say, the inner workings of these entities may be as shown in FIG. 10 and independently, the surrounding network topology may be that of FIG. 9.

In FIG. 10, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, and thereby provide benefits such as reduced user waiting time, better responsiveness and extended battery life.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 11:
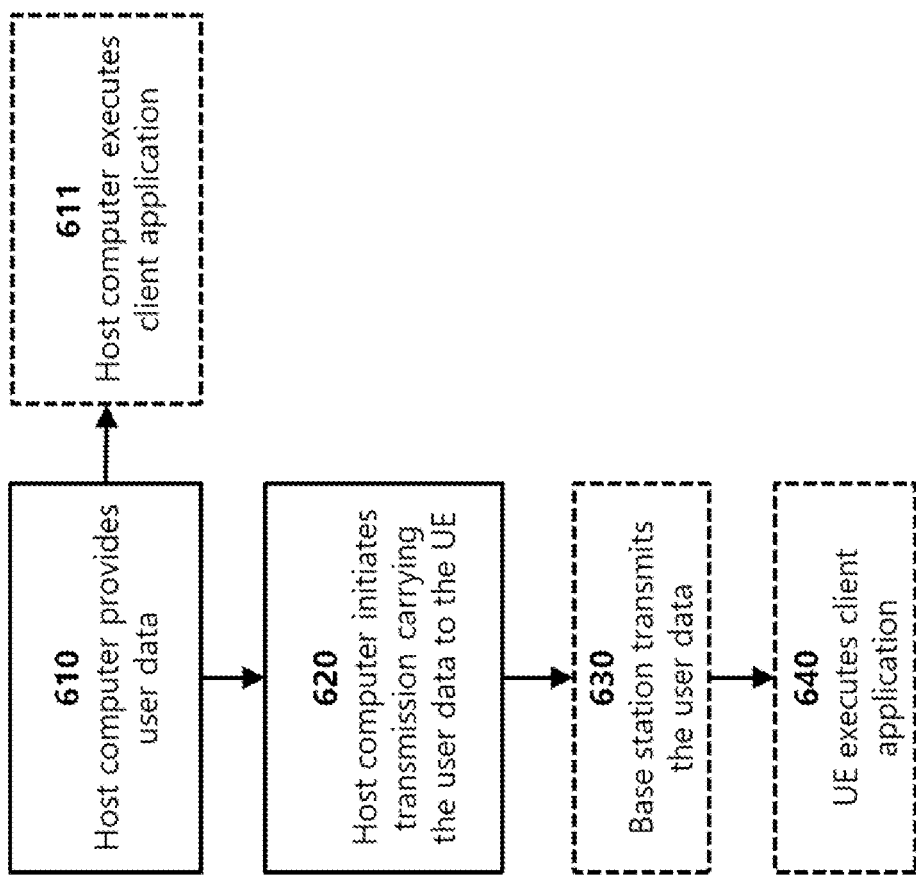
FIG. 11 is a flowchart illustrating a method implemented, according to certain embodiments.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 12:
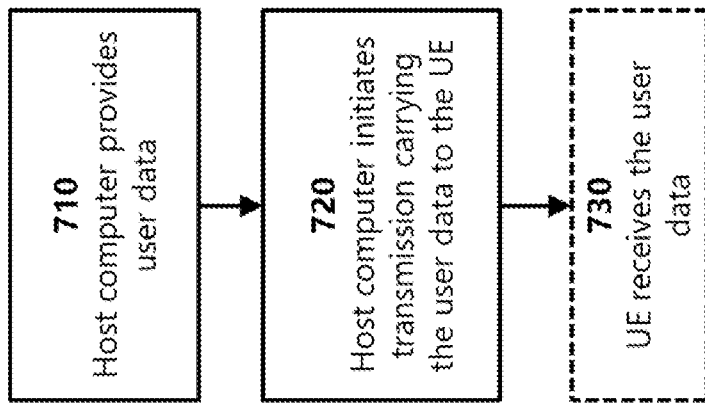
FIG. 12 is a flowchart illustrating a method implemented in a communication system, according to certain embodiments.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 13:
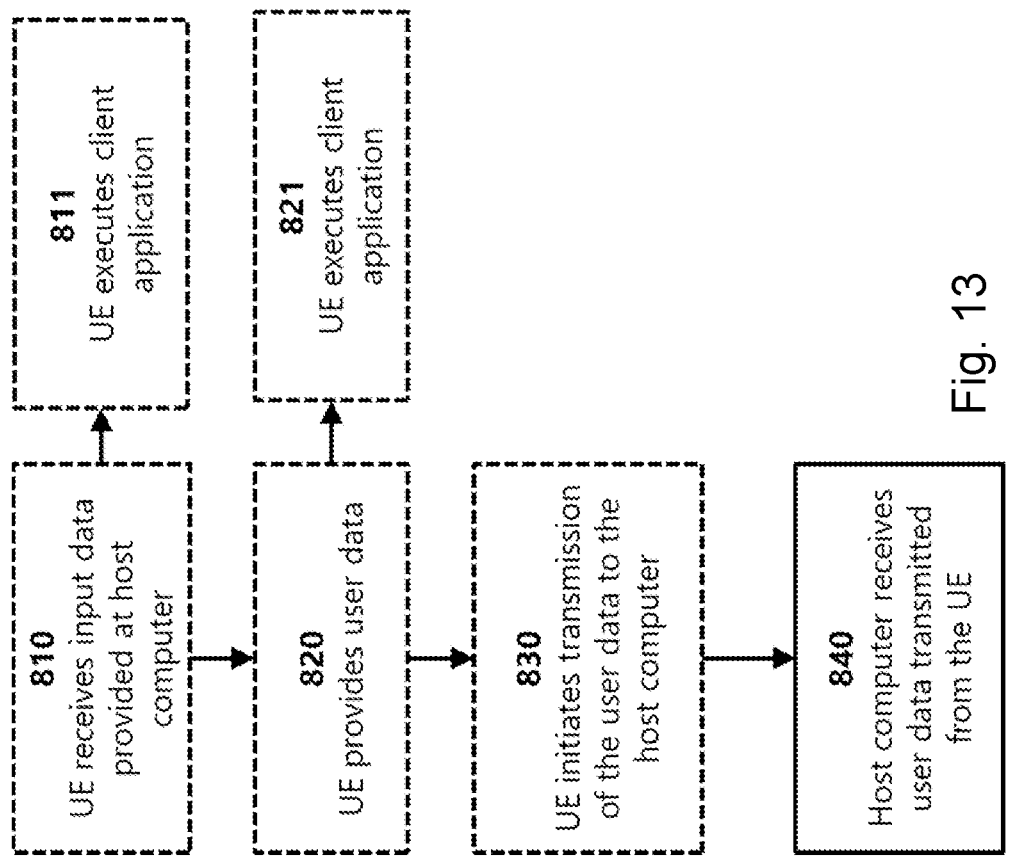
FIG. 13 is a flowchart illustrating a method implemented in a communication system, according to certain embodiments.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 14:
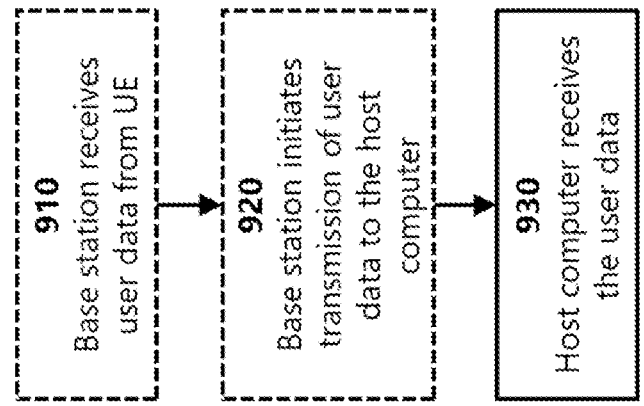
FIG. 14 is a flowchart illustrating a method implemented in a communication system, according to certain embodiments.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
5GC 5th Generation Core
BCCH Broadcast Control Channel
BCH Broadcast Channel
BWP Bandwidth Part
CA Carrier Aggregation
CC Carrier Component
CDMA Code Division Multiplexing Access
CN Core Network
CORESET Control Resource Set
CQI Channel Quality information
CSI Channel State Information
DCCH Dedicated Control Channel
DCI Downlink Control Information
DL Downlink
DM Demodulation
DMRS Demodulation Reference Signal
eNB E-UTRAN NodeB
ePDCCH enhanced Physical Downlink Control Channel
EPS Evolved Packet System
E-SMLC evolved Serving Mobile Location Center
E-UTRA Evolved UTRA
E-UTRAN Evolved UTRAN
FDD Frequency Division Duplex
GERAN GSM EDGE Radio Access Network
gNB Base station in NR
GSM Global System for Mobile communication
HSPA High Speed Packet Access
HRPD High Rate Packet Data
ID Identity/Identifier
LTE Long-Term Evolution
MAC Medium Access Control
MBMS Multimedia Broadcast Multicast Services
MBSFN Multimedia Broadcast multicast service Single Frequency Network
NPDCCH Narrowband Physical Downlink Control Channel
NAS Non-Access Stratum
NGC Next Generation Core
NG-RAN Next Generation RAN
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
P-CCPCH Primary Common Control Physical Channel
PCell Primary Cell
PCFICH Physical Control Format Indicator Channel
PDCCH Physical Downlink Control Channel
PDSCH Physical Downlink Shared Channel PGW Packet Gateway
PLMN Public Land Mobile Network
PMI Precoder Matrix Indicator
PRB Physical Resource Block
PUCCH Physical Uplink Control Channel
PUSCH Physical Uplink Shared Channel
RAN Radio Access Network
RAT Radio Access Technology
RLM Radio Link Management
RNC Radio Network Controller
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
SCell Secondary Cell
SGW Serving Gateway
SI System Information
SNR Signal to Noise Ratio
SS Synchronization Signal
SSS Secondary Synchronization Signal
TDD Time Division Duplex
TTI Transmission Time Interval
UE User Equipment
UL Uplink
UMTS Universal Mobile Telecommunication System
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device, the method comprising:
   determining geographical location information of the wireless device with respect to each cell of a plurality of cells;
   adjusting a cell reselection ranking for the plurality of cells based on the geographical location information for the plurality of cells;
   selecting a cell from the plurality of cells based on the adjusted ranking; and
   camping on the selected cell, wherein adjusting the ranking for the plurality of cells based on the geographical location information comprises adjusting a reference signal received power (RSRP) measurement for each cell as a function of the geographical location information of the wireless device with respect to each cell and reranking the plurality of cells using the adjusted RSRP measurement for each cell.

2. The method of claim 1, further comprising ranking the plurality of cells based on a reference signal received power (RSRP) measurement of each cell of the plurality of cells.

3. The method of claim 1, wherein the geographical location information comprises a distance between the wireless device and a reference point associated with a cell of the plurality of cells.

4. The method of claim 3, wherein the reference point comprises a center of the cell.

5. The method of claim 1, wherein the geographical location information comprises any one or more of the following:
   a distance between the wireless device and a reference point associated with a synchronization signal beam (SSB) of a cell of the plurality of cells;
   a distance between the wireless device and a satellite serving a cell of the plurality of cells;
   a round trip time (RTT) associated with a satellite serving a cell of the plurality of cells; and
   an angle of elevation between the wireless device and a satellite serving a cell of the plurality of cells.

6. The method of claim 1, further comprising receiving the function to use for adjusting the RSRP measurement for each cell from a network node.

7. The method of claim 1, wherein adjusting the RSRP measurement for each cell comprises adjusting the RSRP measurement based on an RSRP measurement inaccuracy of the wireless device.

8. A wireless device comprising processing circuitry operable to:
   determine geographical location information of the wireless device with respect to each cell of a plurality of cells;
   adjust a cell reselection ranking for the plurality of cells based on the geographical location information for the plurality of cells;
   select a cell from the plurality of cells based on the adjusted ranking; and
   camp on the selected cell, wherein the processing circuitry is operable to adjust the ranking for the plurality of cells based on the geographical location information by adjusting a reference signal received power (RSRP) measurement for each cell as a function of the geographical location information of the wireless device with respect to each cell and reranking the plurality of cells using the adjusted RSRP measurement for each cell.

9. The wireless device of claim 8, the processing circuitry further operable to rank the plurality of cells based on a reference signal received power (RSRP) measurement of each cell of the plurality of cells.

10. The wireless device of claim 8, wherein the geographical location information comprises a distance between the wireless device and a reference point associated with a cell of the plurality of cells.

11. The wireless device of claim 10, wherein the reference point comprises a center of the cell.

12. The wireless device of claim 8, wherein the geographical location information comprises any one or more of the following:
   a distance between the wireless device and a reference point associated with a synchronization signal beam (SSB) of a cell of the plurality of cells;
   a distance between the wireless device and a satellite serving a cell of the plurality of cells;
   a round trip time (RTT) associated with a satellite serving a cell of the plurality of cells; and
   an angle of elevation between the wireless device and a satellite serving a cell of the plurality of cells.

13. The wireless device of claim 8, the processing circuitry further operable to receive the function to use for adjusting the RSRP measurement for each cell from a network node.

14. The wireless device of claim 8, wherein the processing circuitry is operable to adjust the RSRP measurement for each cell by adjusting the RSRP measurement based on an RSRP measurement inaccuracy of the wireless device.

15. The wireless device of claim 8, the processing circuitry further operable to receive an indication from a network node that the wireless device may determine a ranking for the plurality of cells by using geographical location information.

16. A network node comprising processing circuitry operable to:
    transmit an indication to a wireless device that the wireless device may determine a cell reselection ranking for a plurality of cells by adjusting a ranking based on geographical location information of the wireless device respect to each cell of the plurality of cells.

17. The network node of claim 16, the processing circuitry further operable to transmit to the wireless device an indication of a function that the wireless device may use to determine a ranking for a plurality of cells by adjusting a reference signal received power (RSRP) ranking based on geographical location information of the wireless device with respect to each cell of the plurality of cells.

18. The network node of claim 16, the processing circuitry further operable to transmit to the wireless device an indication of a type of geographical location information that the wireless device may use to determine a cell reselection ranking for a plurality of cells, the geographic location information comprising any one or more of the following:
    a distance between the wireless device and a reference point associated with a cell of the plurality of neighbor cells;
    a distance between the wireless device and a reference point associated with a synchronization signal beam (SSB) of a cell of the plurality of cells;
    a distance between the wireless device and a satellite serving a cell of the plurality of cells a round trip time (RTT) associated with a satellite serving a cell of the plurality of cells; and
    an angle of elevation between the wireless device and a satellite serving a cell of the plurality of cells.

* * * * *